United States Patent
Wei et al.

(10) Patent No.: US 10,840,776 B2
(45) Date of Patent: Nov. 17, 2020

(54) SELF-CONTAINED BRUSHLESS MOTOR AND BRUSHLESS CONTROLLER

(71) Applicant: ACTUATOR ELECTRIC MOTORS, Zhejiang (CN)

(72) Inventors: Wang Wei, Zhejiang (CN); Zhu Hao, Zhejiang (CN); Jonathan Funkhouser, Zhejiang (CN)

(73) Assignee: ACTUATOR ELECTRIC MOTORS, Yuyao (CN)

( * ) Notice: Subject to any disclaimer, the term of this patent is extended or adjusted under 35 U.S.C. 154(b) by 339 days.

(21) Appl. No.: 15/710,045

(22) Filed: Sep. 20, 2017

(65) Prior Publication Data
US 2018/0342934 A1 Nov. 29, 2018

(30) Foreign Application Priority Data

May 27, 2017 (WO) ................ PCT/CN2017/086314

(51) Int. Cl.
| | |
|---|---|
| *H02K 11/33* | (2016.01) |
| *H02K 21/16* | (2006.01) |
| *H02K 5/22* | (2006.01) |
| *H02K 1/27* | (2006.01) |
| *H02K 3/52* | (2006.01) |

(52) U.S. Cl.
CPC ............ *H02K 11/33* (2016.01); *H02K 5/225* (2013.01); *H02K 21/16* (2013.01); *H02K 1/2733* (2013.01); *H02K 3/522* (2013.01); *H02K 2213/03* (2013.01)

(58) Field of Classification Search
CPC ................................ H02K 11/30; H02K 11/33
USPC .... 310/48, 53, 66, 68 R, 89, 156.08, 156.12
See application file for complete search history.

(56) References Cited

U.S. PATENT DOCUMENTS

| | | | | |
|---|---|---|---|---|
| 5,939,807 A | * | 8/1999 | Patyk | H02K 5/161 310/64 |
| 6,411,006 B2 | * | 6/2002 | Suzuki | H02K 1/148 310/261.1 |
| 6,492,753 B2 | | 12/2002 | Zepp et al. | |
| 6,652,249 B2 | | 11/2003 | Kenney et al. | |
| 7,057,318 B2 | | 6/2006 | Strobl et al. | |
| 7,414,337 B2 | | 8/2008 | Wilkinson et al. | |
| 7,791,232 B2 | | 9/2010 | Purohit et al. | |

(Continued)

FOREIGN PATENT DOCUMENTS

| | | |
|---|---|---|
| EP | 1 832 851 A2 | 9/2007 |
| WO | WO-2016/192003 A1 | 12/2016 |

OTHER PUBLICATIONS

International Search Report & Written Opinion in International Application No. PCT/US2018/034603, dated Aug. 21, 2018 (13 pages).

(Continued)

*Primary Examiner* — Nguyen Tran
(74) *Attorney, Agent, or Firm* — Foley & Lardner LLP

(57) ABSTRACT

A brushless direct current electric motor assembly includes a housing having a first end and a second end and a stator disposed in the housing. The assembly further includes a rotor subassembly disposed in the stator, the rotor subassembly having a shaft having a first end proximate the first end of the housing and a second end proximate the second end of the housing. The assembly further includes a controller disposed in the housing, the controller configured to control rotation of the shaft. The first end of the shaft is configured to provide a rotational output.

11 Claims, 3 Drawing Sheets

(56) References Cited

U.S. PATENT DOCUMENTS

| | | |
|---|---|---|
| 7,915,772 B2 | 3/2011 | Wong |
| 8,148,860 B2 | 4/2012 | Wong et al. |
| 8,217,542 B2 | 7/2012 | Wong |
| 8,471,430 B2 | 6/2013 | Lau et al. |
| 8,567,521 B2 | 10/2013 | Lau |
| 8,749,110 B2 | 6/2014 | Wong et al. |
| 8,786,160 B2 | 7/2014 | Migliarelli |
| 8,970,078 B2 | 3/2015 | Zhang et al. |
| 9,077,230 B2 | 7/2015 | Lau et al. |
| 9,450,471 B2 | 9/2016 | Mergener et al. |
| 9,467,028 B2 | 10/2016 | Zeng et al. |
| 9,577,493 B2 | 2/2017 | Ekstrom et al. |
| 9,621,009 B2 | 4/2017 | Matsunaga et al. |
| 9,692,329 B2 | 6/2017 | Guo et al. |
| 9,713,270 B2 | 7/2017 | Bussa et al. |
| 9,721,743 B2 | 8/2017 | Qin et al. |
| 9,762,103 B2 | 9/2017 | Liang et al. |
| 9,762,104 B2 | 9/2017 | Li et al. |
| 9,774,229 B1 | 9/2017 | Mergener et al. |
| 9,787,159 B2 | 10/2017 | Beyerl |
| 9,837,878 B2 | 12/2017 | Osborne et al. |
| 10,001,139 B2 | 6/2018 | Zhang et al. |
| 10,008,911 B2 | 6/2018 | Qin et al. |
| 10,110,102 B2 | 10/2018 | Li et al. |
| 10,116,191 B2 | 10/2018 | Zhang et al. |
| 10,153,717 B2 | 12/2018 | Cai et al. |
| 2006/0100723 A1 | 5/2006 | Sun et al. |
| 2007/0252451 A1 | 11/2007 | Shibuya et al. |
| 2012/0039729 A1* | 2/2012 | Horng .................. F04D 25/0606 417/410.1 |
| 2013/0313925 A1 | 11/2013 | Mergener et al. |
| 2013/0342084 A1* | 12/2013 | Su ............................ H02K 9/06 310/60 R |
| 2014/0062226 A1* | 3/2014 | Cho ....................... H02K 29/08 310/43 |
| 2014/0239751 A1 | 8/2014 | Tokairin et al. |
| 2014/0361645 A1 | 12/2014 | Beyerl |
| 2015/0318766 A1 | 11/2015 | Luo et al. |
| 2016/0043618 A1 | 2/2016 | Lai et al. |
| 2016/0149474 A1 | 5/2016 | Smith et al. |
| 2016/0181883 A1 | 6/2016 | Yamasaki et al. |
| 2016/0181892 A1 | 6/2016 | Purohit et al. |
| 2016/0226330 A1 | 8/2016 | Li et al. |
| 2016/0294266 A1 | 10/2016 | Li et al. |
| 2016/0341202 A1 | 11/2016 | Chai et al. |
| 2017/0058915 A1 | 3/2017 | Liang et al. |
| 2017/0149304 A1 | 5/2017 | Li et al. |
| 2017/0179803 A1 | 6/2017 | Li et al. |
| 2017/0222497 A1 | 8/2017 | Yu et al. |
| 2017/0257009 A1 | 9/2017 | Luo et al. |
| 2017/0271949 A1 | 9/2017 | Mergener et al. |
| 2017/0279338 A1 | 9/2017 | Li et al. |
| 2017/0279342 A1 | 9/2017 | Li et al. |
| 2017/0294819 A1 | 10/2017 | Crosby et al. |
| 2017/0331355 A1 | 11/2017 | He et al. |
| 2017/0338722 A1 | 11/2017 | Luo et al. |
| 2017/0353085 A1* | 12/2017 | Kitamura ................ H02K 9/22 |
| 2017/0353132 A1 | 12/2017 | Qin et al. |
| 2017/0373620 A1 | 12/2017 | Chang et al. |
| 2018/0083510 A1 | 3/2018 | Purohit et al. |
| 2018/0083517 A1 | 3/2018 | Li et al. |
| 2018/0152062 A1 | 5/2018 | Chang et al. |
| 2018/0175694 A1 | 6/2018 | Keil et al. |
| 2018/0262092 A1 | 9/2018 | Beyerl et al. |
| 2018/0278115 A1 | 9/2018 | Wu et al. |
| 2018/0301960 A1 | 10/2018 | Li et al. |
| 2018/0337578 A1 | 11/2018 | Li et al. |
| 2018/0338374 A1 | 11/2018 | Li et al. |
| 2019/0006907 A1 | 1/2019 | Li et al. |
| 2019/0006980 A1 | 1/2019 | Sheeks et al. |
| 2019/0020240 A1 | 1/2019 | Yeung et al. |

OTHER PUBLICATIONS

Extended European Search Report in EP Application No. 18808822.3, dated Apr. 28, 2020.

* cited by examiner

SELF-CONTAINED BRUSHLESS MOTOR AND BRUSHLESS CONTROLLER

CROSS-REFERENCE TO RELATED APPLICATIONS

The present application claims the benefit of priority under 35 U.S.C. § 119 to International Application No. PCT/CN2017/086314, filed on May 27, 2017, which is incorporated herein in its entirety.

BACKGROUND

The present application relates generally to the field of brushless electric motors and more specifically, to motors having controllers disposed within a motor housing.

Electric power tools (e.g., hand held tools, lawn and garden tools, etc.) are generally powered by Permanent Magnet Direct Current ("PMDC") motors. Brushes in a PMDC motor physically engage a commutator, producing friction between the brushes and the commutator. This friction contributes to operating noise and wear on the brushes, as well as increased operating temperatures, thereby limiting the service life of a PMDC motor.

SUMMARY

One embodiment relates to a brushless direct current electric motor assembly, including a housing having a first end and a second end and a stator disposed in the housing. The assembly further includes a rotor subassembly disposed in the stator, the rotor subassembly having a shaft having a first end proximate the first end of the housing and a second end proximate the second end of the housing. The assembly further includes a controller disposed in the housing, the controller configured to control rotation of the shaft. The first end of the shaft is configured to provide a rotational output.

Another embodiment relates to an electrical device, including a driven member, and a brushless direct current electric motor assembly. The assembly includes a housing having a first end and a second end and a stator disposed in the housing. The assembly further includes a rotor subassembly disposed in the stator, the rotor subassembly having a shaft having a first end proximate the first end of the housing and a second end proximate the second end of the housing. The assembly further includes a controller disposed in the housing, the controller configured to control rotation of the shaft. The first end of the shaft is coupled to the driven member and the shaft is configured to rotate the driven member.

DETAILED DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

In order to reduce friction in the motor, a Brushless Direct Current ("BLDC") motor may be used instead of a PMDC motor. In a BLDC motor, electrical current runs through windings in a stator, forming a magnetic field to interact with permanent magnets on a rotor. The rotor and the stator are physically separated, such that the BLDC operates without any brushes, reducing friction in the BLDC motor relative to a PMDC motor. However, in contrast to PMDC motors, BLDC motors require a controller for operation. In conventional BLDC motors, the controller is positioned external to the motor (e.g., in a handle or pedal of a tool).

As will become clear in the following application, it may be advantageous to provide a BLDC motor with a controller disposed within a motor housing. For example, by positioning the controller within the housing, the electric motor can be fully assembled prior to installation in an electrical device (e.g., power tool, etc.), reducing cost and complexity of installing the motor in the electrical device to rotate a driven member. For power tools, the electric motor may be coupled to a chuck (e.g., for a drill, lathe, etc.) as a driven member. Similarly, the electric motor may drive a socket for installing lugs on an automobile or a truck. Furthermore, structure in the housing may assist in cooling the controller. For example, the housing may include a fan and other structures as heat sinks.

Figure 1:
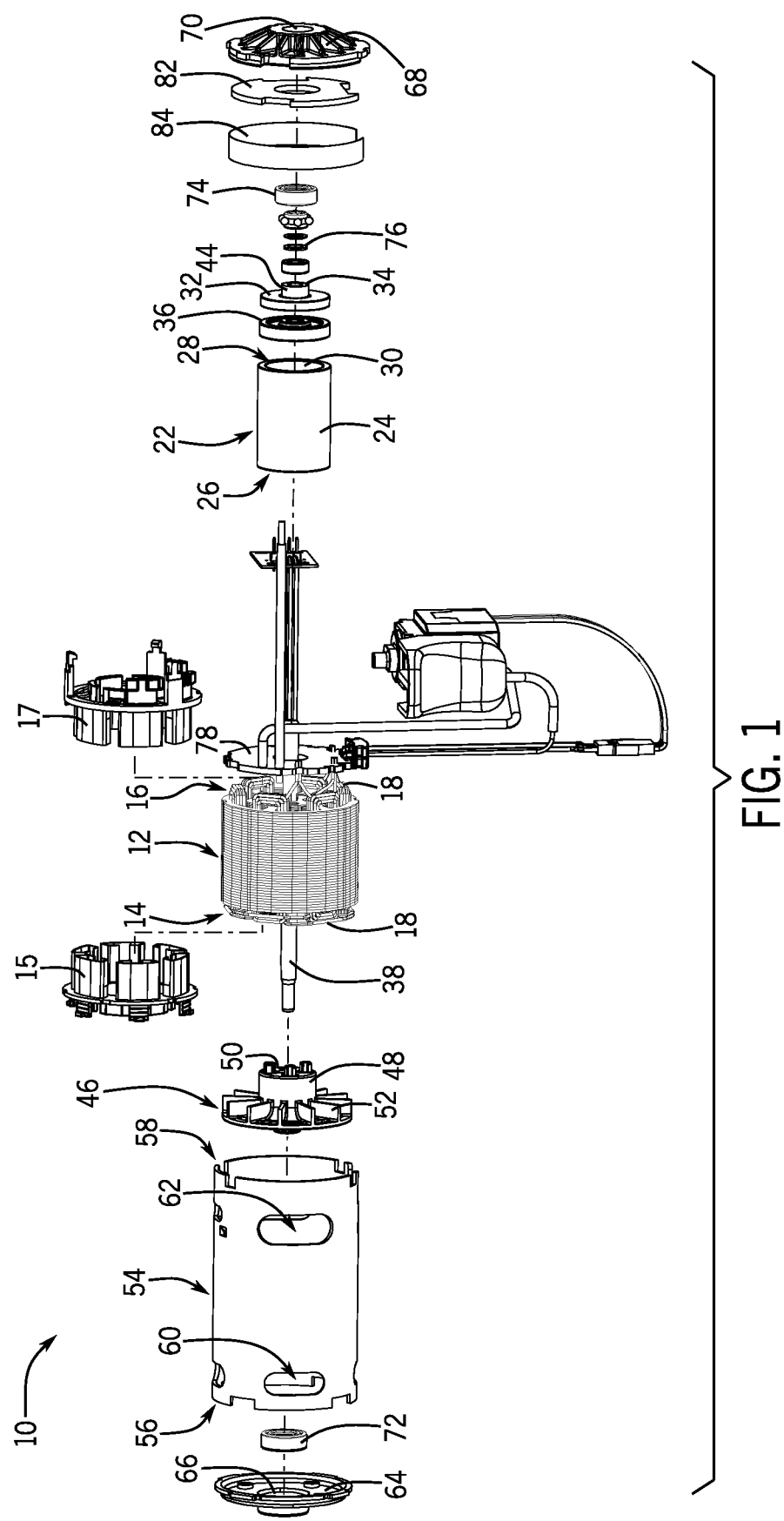
FIG. 1 is an exploded view of motor, according to an illustrative embodiment.
Figure 2:
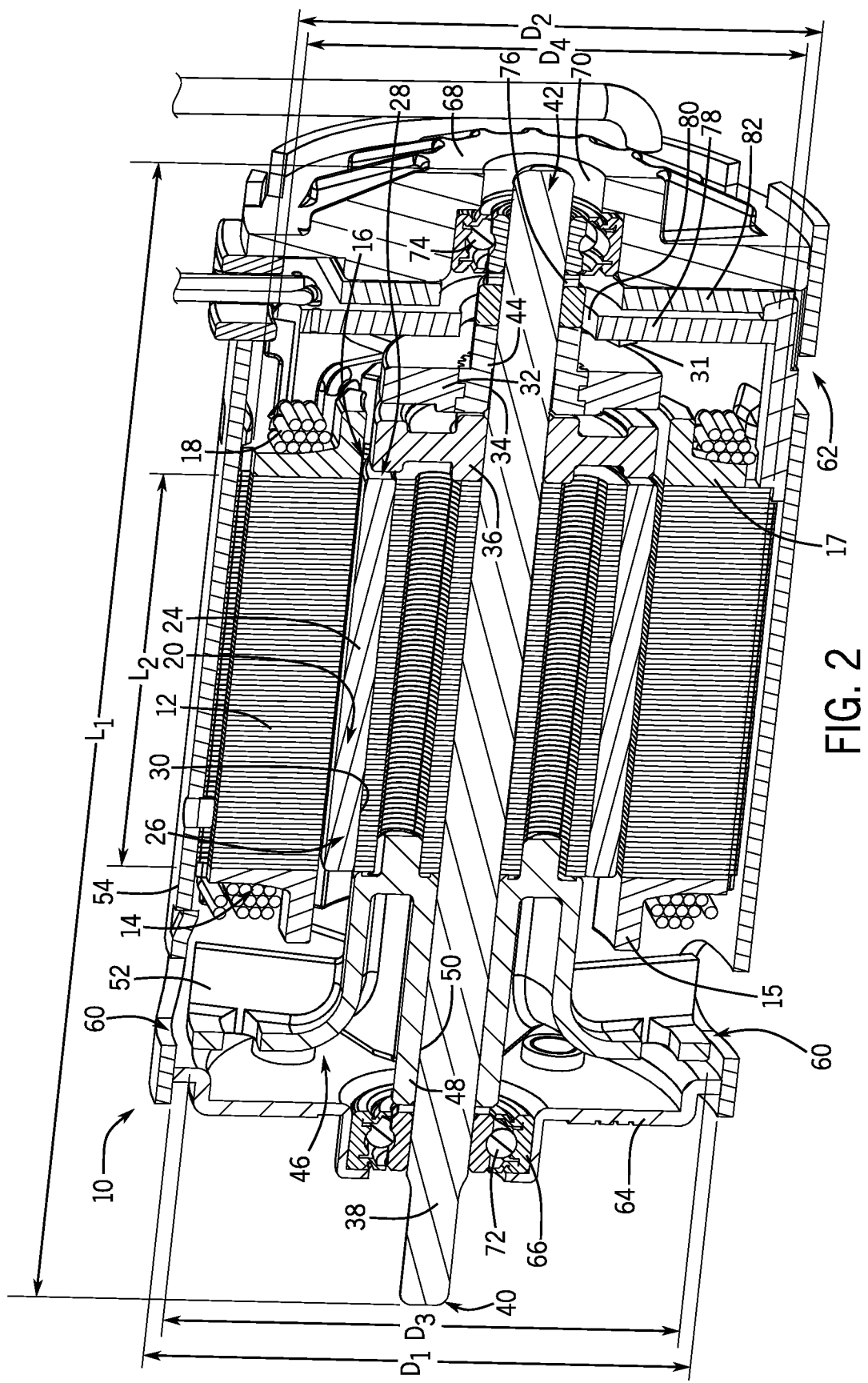
FIG. 2 is a cross-sectional view of the motor of FIG. 1.

Referring to FIGS. 1 and 2, a BLDC electric motor assembly 10 is shown according to an illustrative embodiment. The assembly 10 includes a stator 12 having a first (e.g., forward) end 14 and an opposing second (e.g., rear) end 16. Magnet wire forms a plurality of windings 18 around the stator 12. The windings 18 are configured to receive an electric current (e.g., direct current) running therethrough, generating a magnetic field. The stator 12 defines a stator bore 20 extending from the first end 14 to the second end 16 and is configured to receive a rotor subassembly 22 disposed therein.

The rotor subassembly 22 includes a magnet ring 24 having a first (e.g., forward) end 26 and an opposing second (e.g., rear) end 28. The magnet ring 24 defines a magnet ring bore 30 extending from the first end 26 to the second end 28. The magnet ring 24 is formed from a permanent magnet configured to magnetically interact with the magnetic field generated by the windings 18. A sensor magnet 32 is disposed proximate the second end 28 of the magnet ring 24 and defines a sensor magnet bore 34 extending therethrough.

The sensor magnet 32 includes at least two pairs of north and south poles. For example, a first north-south pair of poles defines a first magnetic axis (e.g., coplanar with the sensor magnet 32) and a second north-south pair of poles defines a second magnetic axis (e.g., coplanar with the sensor magnet 32) crossing over (e.g., perpendicular to, orthogonal to, etc.) the first magnetic axis. According to other illustrative embodiments, the sensor magnet 32 may define more or fewer north-south pairs of poles. Referring to FIG. 2, the sensor magnet 32 is disposed proximate a controller 78, such that the poles in the sensor magnet 32 magnetically interact with hall sensors on the controller 78. The hall sensors trigger between an on position and an off position based on the orientation of the poles, which measures the speed of rotation of the rotor subassembly 22. While FIGS. 1 and 2 show a sensor magnet 32 separately formed from the magnet ring, according to other illustrative embodiments, the second end 28 of the magnet ring 24 may be magnetized with the desired pole structure to magnetically interact with the hall sensors.

The rotor subassembly 22 further includes a shaft 38 (e.g., rotor) disposed in the magnet ring bore 30 and the sensor magnet bore 34. The shaft 38 has a generally annular (e.g., cylindrical) shape and defines a first (e.g., forward, output) end 40 and a second (e.g., rear) end 42. The first end 40 of the shaft 38 is configured to provide a rotational output from the assembly 10. The shaft 38 has a shaft length $L_1$ extending between the first and second ends 40, 42 that is substantially larger than a stator length $L_2$ extending between the first and second ends 14, 16 of the stator 12. In this configuration, when the rotor subassembly 22 is disposed in the stator 12, at least one of the ends 40, 42 of the shaft 38 extends axially outwardly from the stator 12. As shown in FIG. 2, both ends 40, 42 may extend axially outwardly from the stator 12. Furthermore, the sensor magnet 32 and the spacer 36 are disposed proximate and axially outward from the second end 16 of the stator 12.

Referring still to FIGS. 1 and 2, a spacer 36 may be disposed between the magnet ring 24 and the sensor magnet 32 in order to space the sensor magnet 32 apart from the magnet ring 24. The shaft 38 is coupled to the sensor magnet 32 and rotationally fixed relative to the sensor magnet 32, such that as the magnet ring 24 causes the sensor magnet 32 to rotate, the shaft 38 rotates at substantially the same angular velocity as each of the magnet ring 24 and the sensor magnet 32. As shown in FIG. 2, a sleeve 44 is disposed between the sensor magnet 32 and the shaft 38, directly on the shaft 38 proximate the second end 42 and configured to maintain a fixed rotational orientation between the sensor magnet 32 and the shaft 38. For example, the sleeve 44 may be formed from a compressible material configured to frictionally engage the shaft 38. For example, the sleeve 44 may be a brass ring that is press-fit onto the shaft 38, such that the sleeve 44 is rotationally fixed relative to the shaft 38. The sensor magnet bore 34 may define complementary features to the sleeve 44 or may frictionally engage the sleeve (e.g., by being press-fit on the sleeve 44 or being over-molded onto the sleeve 44), such that the sensor magnet 32 is rotationally fixed relative to the sleeve 44. According to another illustrative embodiment, one of the shaft 38 or the sleeve 44 defines a slot and the other of the shaft 38 or the sleeve 44 defines a key configured to be received in the slot. The sensor magnet 32 may also be rotationally fixed to the shaft 38 in other ways.

Referring still to FIGS. 1 and 2, the rotor subassembly 22 further includes a fan 46. The fan 46 includes a hub portion 48 defining a fan bore 50 extending therethrough, and a plurality of blades 52 extending radially outward from the hub portion 48. The fan 46 is disposed proximate or on the first end 26 of the magnet ring 24 and the fan bore 50 is configured to receive the shaft 38 extending therethrough. The fan 46 is coupled to at least one of the magnet ring 24 or the shaft 38, such that the fan 46 is rotationally fixed relative to the to the shaft 38. As a rotational velocity of the shaft 38 increases in the stator 12, rotational velocity of the fan 46 also increases, thereby increasing air flow in the assembly 10 for cooling the assembly 10.

The assembly 10 further includes a housing 54 (e.g., case, shell, etc.) defining a first (e.g., forward) end 56 and a second (e.g., rear) end 58. The housing 54 is substantially annular (e.g., cylindrical), defining a housing inner diameter $D_1$ (e.g., between approximately 30 mm and 70 mm) that is larger than a stator outer diameter $D_2$, such that the stator 12 is configured to be received within the housing 54. Similarly, the fan 46 defines a fan outer diameter $D_3$ that is less than the housing inner diameter $D_1$, such that the fan 46 as well as the rotor subassembly 22, more generally, are configured to be received within the housing 54. A plurality of first (e.g., air inlet) openings 60 are defined in the housing 54 proximate the first end 56 and a plurality of second (e.g., air outlet) openings 62 are defined in the housing 54 proximate the second end 58. The blades 52 are disposed proximate the first openings 60 and are configured to draw air into an interior portion of the housing 54, through the first openings 60 and toward the second openings 62 for cooling components within the housing 54 during operation of the assembly 10. According to other illustrative embodiments, the first openings 60 and/or the second openings 62 may be configured to provide access for wiring to extend into the housing 54.

A first holder 15 is configured to engage the first end 14 of the stator 12, and a second holder 17 is configured to engage the second end 16 of the stator 12. The first and second holders 15, 17 are disposed between and engage the stator 12 and the housing 54, such that the stator 12 does not directly engage the housing 54. The first and second holders 15, 17 are formed from generally electrically non-conductive materials and are configured to electrically insulate the stator 12 from the housing 54.

A first (e.g., forward) cap 64 is disposed on the first end 56 of the housing 54 and defines a first cap bore 66 configured to receive the first end 40 of the shaft 38 therethrough. Similarly, a second (e.g., rear) cap 68 is disposed on the second end 58 of the housing 54 and defines a second cap bore 70 configured to receive the second end 42 of the shaft 38 therethrough. According to another illustrative embodiment, one of the first and second caps 64, 68 may be substantially solid (e.g., without a bore 66, 70 for receiving the shaft 38). A first ball bearing 72 is disposed annularly about the shaft 38 proximate the first end 40 and engages the bore 66 of the first cap 64, such that the shaft 38 is supported by the first cap 64. Similarly, a second ball bearing 74 is disposed annularly about the shaft 38 proximate the second end 42 and engages the bore 70 of the second cap 68, such that the shaft 38 is also supported by the second cap 68. As shown in FIGS. 1 and 2, at least one washer 76 (e.g., spacer, shim, etc.) may be disposed between the rotor subassembly 22 and the first ball bearing 72 and/or between the rotor subassembly 22 and the second ball bearing 74. According to various illustrative embodiments, the first and second caps 64, 68 may be fastened (e.g., with rivets, screws, bolts, etc.) to the housing 54 or may be coupled (e.g., welded) to the housing 54 in other ways.

Figure 3:
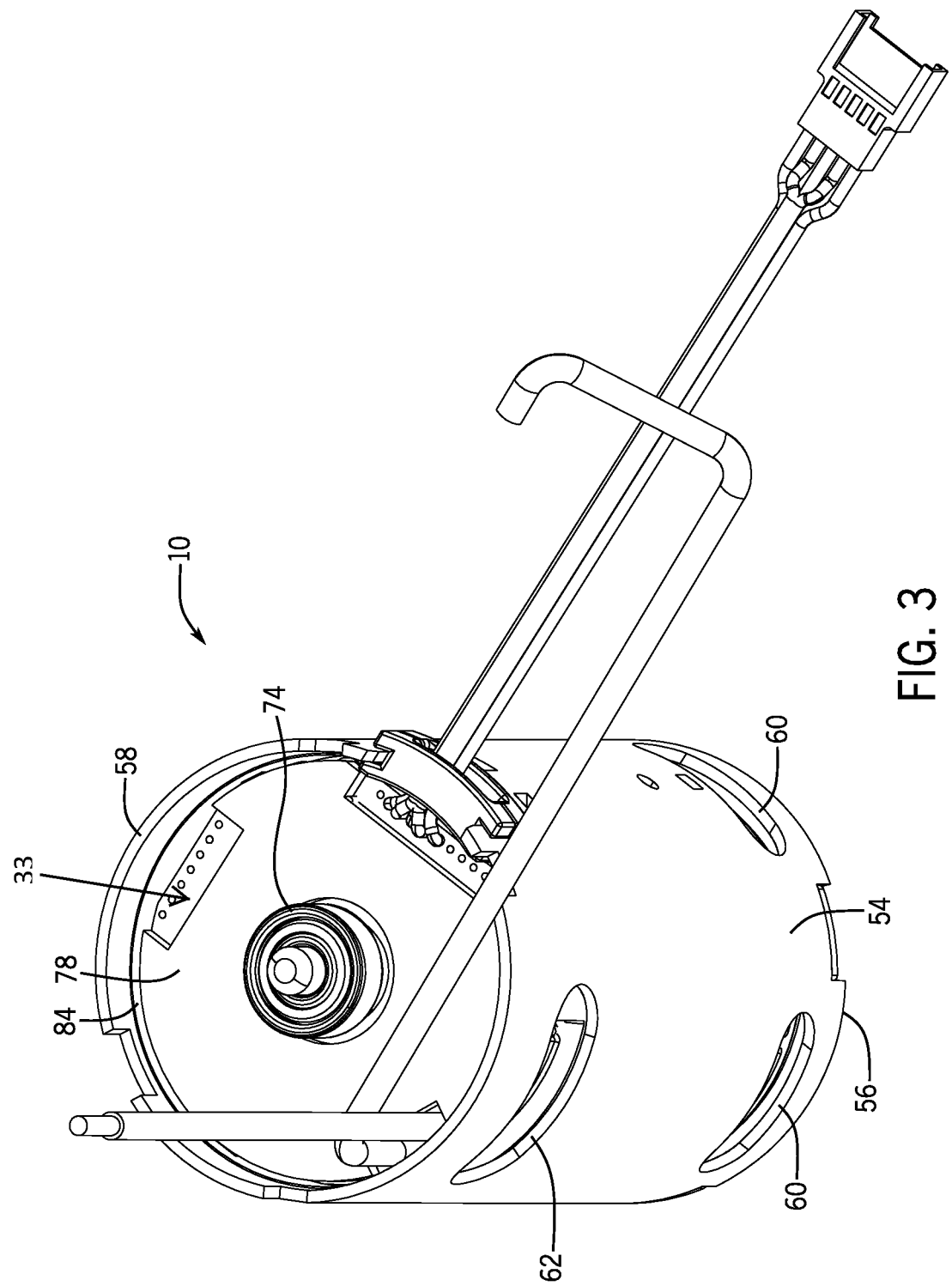
FIG. 3 is a rear perspective view of the motor of FIG. 1 with a cap removed.

Referring now generally to FIGS. 1-3, the controller 78 is shown according to an illustrative embodiment. The controller 78 may be coupled to the stator with screws and/or plastic clips extending from the stator toward the controller 78. The controller 78 is configured to control operation of the assembly 10 by controlling current through the windings 18, which in turn controls the speed of rotation of the rotor subassembly 22 in the stator 12. For example, the controller 78 is configured to control the rotation of the shaft 38, and therefore, rotational output by the shaft 38 from the assembly 10. The controller 78 is disposed within the housing 54, proximate the second end 58, between the second end 16 of the stator 12 and the second cap 68. For example, the controller 78 is substantially circular (e.g., annular, disk-shaped), defining a controller outer diameter $D_4$, which is less than the housing inner diameter $D_1$, such that the controller 78 may be fully enclosed within the housing 54 rather than external to the housing 54. At least one of the controller outer diameter $D_4$ or the housing inner diameter $D_1$ may be between approximately 30 mm and 70 mm. Conventional controllers are not small enough to fit within a housing inner diameter $D_1$ that is less than or equal to 70 mm, while still housing all the components required to operate the assembly 10.

The controller 78 defines a controller bore 80 and is configured to receive the second end 42 of the shaft 38 therethrough. The controller bore 80 enables the controller 78 to be disposed within the housing 54, without interfering with the placement and movement of the shaft 38. While FIGS. 1 and 3 show the controller 78 is substantially circular, according to other illustrative embodiments the controller 78 may include other shapes and sizes, such that the controller 78 may be fully enclosed within the assembly 10, with the second end 42 of the shaft 38 extending through the controller bore 80.

Referring to FIGS. 1 and 2, the assembly 10 includes a conductive (e.g., first) ring 82 disposed between the controller 78 and the second cap 68. For example, opposing surfaces of the conductive ring 82 may directly engage the controller 78 and the second cap 68, such that the conductive ring 82 is configured to conduct heat from the controller 78 and transfer the heat to the second cap 68. In this configuration, the second cap 68 may be formed from aluminum and act as a heat sink in order to keep the controller 78 from overheating during operation. The heat transfer between the controller 78 and the second cap 68 further enables the controller 78 to be enclosed within the housing 54 without damaging the controller 78. According to an illustrative embodiment, the conductive ring 82 may be formed from a high voltage and high temperature resisting material. Illustrative high voltage and high temperature resistant materials include, but are not limited to, silicone and other suitable materials configured to conduct heat and electrically insulate the controller 78 directly from the second cap 68 and indirectly from the housing 54. The conductive ring 82 may further be compliant (e.g., compressible) and configured to absorb vibrations applied to the housing 54 rather than passing the vibrations onto the controller 78. By physically isolating the controller 78 from additional stresses, the likelihood of components on the controller 78 being loosened is reduced.

Referring to FIGS. 1 and 3, the assembly 10 includes an insulation (e.g., second) ring 84 disposed between the controller 78 and the housing 54. For example, the insulation ring 84 may be formed from insulation paper disposed annularly (e.g., radially) about the controller 78 and is configured to electrically insulate the controller 78 from the housing 54. For example, the insulation paper may be formed from a high voltage and high temperature resistant material. While FIGS. 1-3 show the assembly 10 having a separate conductive ring 82 and insulation ring 84 configured to electrically insulate the controller 78 from the housing 54, according to other illustrative embodiments, rings 82, 84 may be formed as a single ring having insulation properties or the assembly 10 may include additional rings configured to electrically insulate the controller 78.

While FIGS. 1-3 show the controller 78 disposed between the stator 12 and the second cap 68, according to another illustrative embodiment, the controller 78 may be disposed between the stator 12 and the first cap 64, such that the first end 40 of the shaft 38 extends through the controller bore 80. In this configuration, the fan 46 may be disposed between the controller 78 and the first cap 64, between the controller 78 and the stator 12, or between the stator 12 and the second cap 68. When the fan 46 is disposed proximate the second cap 68, the blades 52 are configured to draw air into the housing 54 through the second openings 62. A conductive ring 82 may be disposed between the controller 78 and the first cap 64 and an insulation ring 84 may be disposed annularly about the controller 78, similarly as described above. Furthermore, the first cap 64 may act as a heat sink.

The controller 78 includes a printed circuit board assembly ("PCBA"). The PCBA includes a MOSFET, a MCU, and Hall effect sensors, and is configured to communicate with and control a DC voltage system (e.g., a battery), lights (e.g., LEDs) for illumination, a speed control, and/or a switch. For example, the Hall effect sensors are disposed on the same PCBA as at least one of the MOSFET or the MCU, rather than on a separate board dedicated to just the Hall effect sensors. This configuration reduces the size of the PCBA for installation as part of the controller 78 in the assembly 10. While the controller 78 is described as having certain components (e.g., sensors) in an illustrative embodiment, it should be understood that in other embodiments, the controller 78 may have more or fewer components or may have different components than those specifically described thus far. The controller 78 may be formed from more than one layer, such that each layer is configured to fit within the housing 54. For example, the controller 78 may include five layers, although more or fewer layers may be included. The Hall effect sensors in a layer disposed closest to the sensor magnet 32 and the controller 78 may be spaced apart from the sensor magnet 32 by approximately 0.5 mm in order to ensure proper magnetic interaction therebetween. As shown in FIGS. 2-3, the Hall effect sensors 31 may be disposed on a first side of the layer of the controller 78 closest to the sensor magnet 32 and the MOSFETs 33 may be disposed on an opposing second side of the layer of the controller 78, such that the MOSFETs 33 face the second cap 68, which acts as a heat sink to the MOSFETs 33. The controller 78 may include between approximately 6 and 12 MOSFETs. For example, MOSFETs may be provided in multiples of six and are configured to transfer power from a power source to the stator 12 or other portion of the assembly 10. Specifically, the assembly 10 may be configured to receive power and operate in a range of approximately 3.6-60 V, or more specifically between approximately 50-60 V. In the above-described configuration, the assembly 10 can be provided as a fully-integrated BLDC electric motor unit, without requiring any additional external controllers for operation. Advantageously, by positioning all the components within the housing 54, the assembly 10 is substantially simpler to install in various tools or automobiles.

As utilized herein, the terms "approximately," "about," "substantially," and similar terms, are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of this disclosure as recited in the appended claims.

It should be noted that the term "illustrative" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the position of elements (e.g., "top," "bottom," "above," "below," etc.) are merely used to describe the orientation of various elements in the FIGURES. It should be noted that the orientation of various elements may differ according to other illustrative embodiments, and that such variations are intended to be encompassed by the present disclosure.

It is to be understood that although the present invention has been described with regard to preferred embodiments thereof, various other embodiments and variants may occur to those skilled in the art, which are within the scope and spirit of the invention, and such other embodiments and variants are intended to be covered by corresponding claims. Those skilled in the art will readily appreciate that many modifications are possible (e.g., variations in sizes, dimensions, structures, shapes and proportions of the various elements, mounting arrangements, use of materials, orientations, etc.) without materially departing from the novel teachings and advantages of the subject matter described herein. For example, the order or sequence of any process or method steps may be varied or re-sequenced according to alternative embodiments. Other substitutions, modifications, changes and omissions may also be made in the design, operating conditions and arrangement of the various illustrative embodiments without departing from the scope of the present disclosure.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A brushless direct current electric motor assembly, comprising:
    a housing having a first end and a second end, the housing comprising a plurality of air inlet openings proximate to the first end and a plurality of air outlet openings proximate to the second end, wherein the housing is substantially tubular between the first end and the second end, and wherein an inner diameter of the housing is between approximately 30 mm and 70 mm;
    a stator disposed in the housing;
    a rotor subassembly disposed in the stator, the rotor subassembly comprising a shaft having a first end proximate the first end of the housing and a second end proximate the second end of the housing;
    a first cap disposed on the first end of the housing;
    a second cap disposed on the second end of the housing, the housing enclosed by the first cap and the second cap;
    a controller disposed in the housing between the second cap and the stator and directly mechanically coupled to the stator, the controller configured to control rotation of the shaft, wherein an outer diameter of the controller is less than the inner diameter of the housing, the controller comprising:
        a printed circuit board assembly (PCBA) having a first side and an opposing second side facing toward the second cap, the PCBA comprising a plurality of electrical components, the plurality of electrical components comprising a microcontroller unit (MCU), a plurality of Hall effect sensors, and at least six MOSFETs, wherein at least one of the Hall effect sensors is disposed on the first side and at least one of the MOSFETs is disposed on the second side, the PCBA configured to communicate with and control at least one of a DC battery, a speed control, or a switch;

a fan rotationally fixed relative to the shaft, the fan disposed between the first cap and the stator and proximate to the air inlet openings, the fan configured to draw air into an interior portion of the housing through the air inlet openings and toward the air outlet openings for cooling the electrical components during operation; and a conductive ring disposed between the controller and the second cap, the conductive ring configured to transfer heat from the controller to the second cap and to electrically insulate the controller from the second cap, the conductive ring formed from a high voltage and high temperature resistive material;

wherein the second cap is configured to operate as a heat sink to draw heat from the MOSFETs;

wherein the controller defines a controller bore configured to receive the shaft therethrough; and wherein the first end of the shaft is configured to provide a rotational output.

2. The assembly of claim 1, wherein the rotor subassembly further comprises a brass sleeve press fit on the shaft proximate the second end of the shaft, and a sensor magnet over-molded onto the brass sleeve;

wherein the sensor magnet is rotationally fixed relative to the shaft; and wherein the sensor magnet is configured to magnetically interact with the Hall effect sensors on the controller to measure a speed of rotation of the rotor subassembly.

3. The assembly of claim 1, further comprising an insulation ring disposed between the controller and the housing, the insulation ring configured to electrically insulate the controller from the housing.

4. The assembly of claim 3, wherein the insulation ring is formed from a high voltage and high temperature resistive material.

5. An electrical device, comprising:
a driven member;
a brushless direct current electric motor assembly, comprising:
  a housing having a first end and a second end, the housing comprising a plurality of air inlet openings proximate to the first end and a plurality of air outlet openings proximate to the second end, wherein the housing is substantially tubular between the first end and the second end, and wherein an inner diameter of the housing is between 30 mm and 70 mm;
  a stator disposed in the housing;
  a rotor subassembly disposed in the stator, the rotor subassembly comprising a shaft having a first end proximate the first end of the housing and a second end proximate the second end of the housing;
  a first cap disposed on the first end of the housing;
  a second cap disposed on the second end of the housing, the housing enclosed by the first cap and the second cap;
  a controller disposed in the housing between the second cap and the stator and directly mechanically coupled to the stator, the controller configured to control rotation of the shaft, wherein an outer diameter of the controller is less than the inner diameter of the housing, the controller comprising:
    a printed circuit board assembly (PCBA) having a first side and an opposing second side facing toward the second cap, the PCBA comprising a plurality of electrical components, the plurality of electrical components comprising a microcontroller unit (MCU), a plurality of Hall effect sensors, and at least six MOSFETs, wherein at least one of the Hall effect sensors is disposed on the first side and at least one of the MOSFETs is disposed on the second side, the PCBA configured to communicate with and control at least one of a DC battery, a speed control, or a switch;
  a fan rotationally fixed to the shaft, the fan disposed proximate to the air inlet openings between the first cap and the stator, the fan configured to draw air into an interior portion of the housing through the air inlet openings and toward the air outlet openings for cooling the electrical components during operation; and
  a conductive ring disposed between the controller and the second cap, the conductive ring configured to transfer heat from the controller to the second cap and to electrically insulate the controller from the second cap, the conductive ring formed from a high voltage and high temperature resistive material;
  wherein the second cap is configured to operate as a heat sink to draw heat from the MOSFETs;
  wherein the first end of the shaft is coupled to the driven member;
  wherein the shaft is configured to rotate the driven member; and
  wherein the driven member is at least one of a socket or a chuck.

6. The brushless direct current electric motor assembly of claim 1, further comprising a compliant spacer disposed between the controller and the housing, wherein the compliant spacer is configured to isolate the controller from vibrations applied to the housing.

7. The brushless direct current electric motor assembly of claim 1, wherein the plurality of layers includes at least five layers.

8. The brushless direct current electric motor assembly of claim 1, wherein the fan directs air flow towards the first side of the PCBA to cool the electrical components positioned on the first side, and wherein the conductive ring and second cap together cool the electrical components positioned on the second side of the PCBA.

9. The brushless direct current electric motor assembly of claim 1, wherein at least one of the MOSFETs is disposed on the first side of the PCBA.

10. The brushless direct current electric motor assembly of claim 1, wherein opposing surfaces of the conductive ring directly engage the controller and the second cap.

11. The brushless direct current electric motor assembly of claim 1, wherein the air outlet openings are disposed between the air inlet openings and the controller.

* * * * *